(No Model.) 2 Sheets—Sheet 1.

E. E. GOLD.
DRAINAGE TRAP.

No. 481,727. Patented Aug. 30, 1892.

WITNESSES:
C. E. Ashley
I. W. Lloyd

INVENTOR:
Edward E. Gold,
By his Attorneys,
Arthur C. Fraser & Co.

(No Model.) 2 Sheets—Sheet 2.

E. E. GOLD.
DRAINAGE TRAP.

No. 481,727. Patented Aug. 30, 1892.

WITNESSES:
C. E. Ashley
H. W. Lloyd.

INVENTOR:
Edward E. Gold,
By his Attorneys,
Arthur E. Fraser

UNITED STATES PATENT OFFICE.

EDWARD E. GOLD, OF NEW YORK, N. Y.

DRAINAGE-TRAP.

SPECIFICATION forming part of Letters Patent No. 481,727, dated August 30, 1892.

Application filed June 27, 1892. Serial No. 438,065. (No model.)

*To all whom it may concern:*

Be it known that I, EDWARD E. GOLD, a citizen of the United States, residing in the city, county, and State of New York, have invented certain new and useful Improvements in Drainage-Traps for Steam-Pipes, of which the following is a specification.

This invention relates to dynamic traps or drainage-valves for draining off water of condensation from steam-pipes, being particularly suitable for use with the steam-heating pipes of railway-cars, both as applied to the pipe or hose couplings for uniting the successive sections of the steam-heating pipes together and to the condensation water-pockets or sediment-wells applied to such pipes, and in other applications. The trap-valve is constructed to open outwardly, so that it is closed and held to its seat by internal pressure; but when the steam is turned off it opens automatically and drains out the accumulated water. Heretofore such dynamic traps have been opened by the tension of a spring (or weight) acting to lift the valve bodily from its seat.

My present invention introduces an improved and simplified construction wherein springs are dispensed with and the trap is constructed with only one moving part. The valve is loosely mounted, so that it may tilt on its seat, and is provided with a stem projecting rigidly from it in such direction and to such distance that the center of gravity of the stem (or of a counter-weight carried by it) is to one side of the valve, so that its weight causes the valve, when relieved of internal pressure, to open by tilting on its seat.

Figure 1:
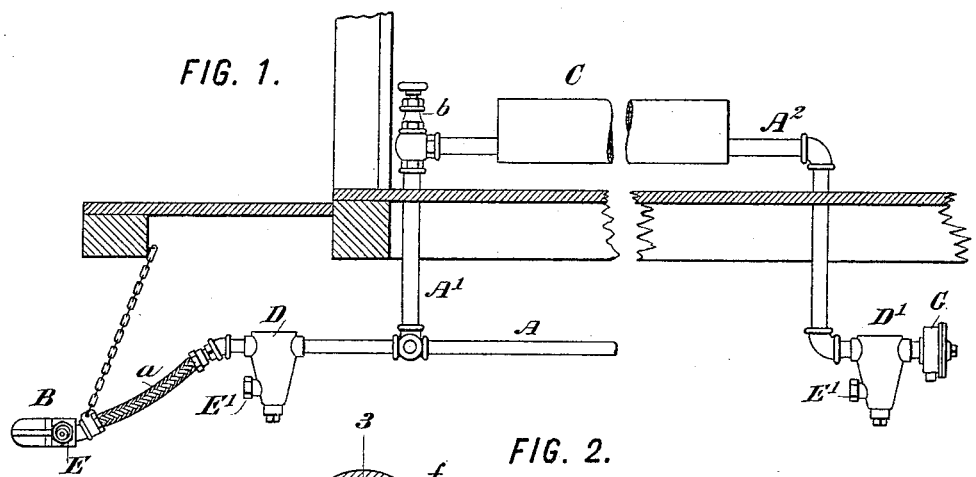
Figure 2:
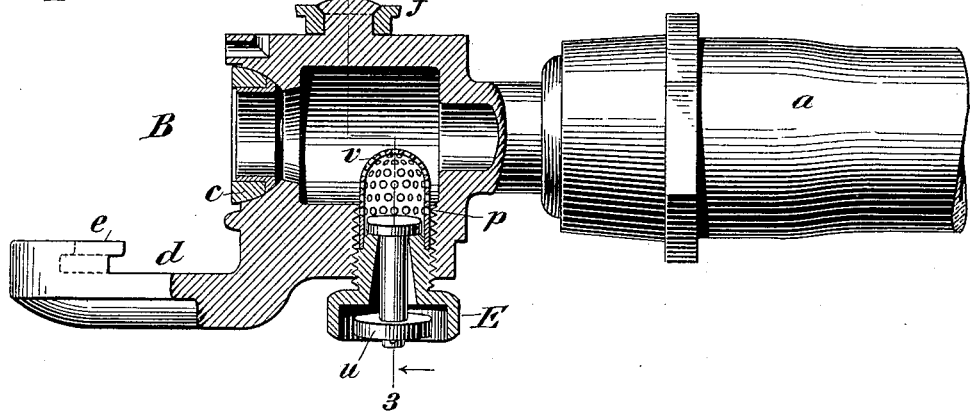
Figure 3:
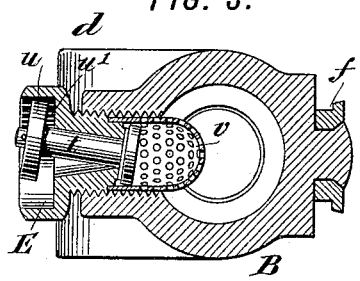
Figure 4:
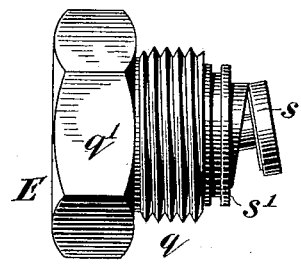
Figure 5:
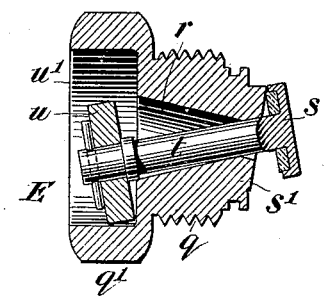
Figure 6:
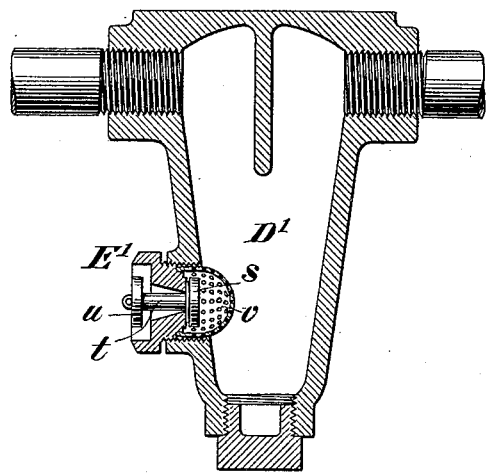
Figure 7:
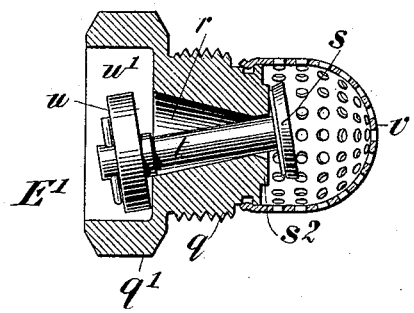
Figure 8:
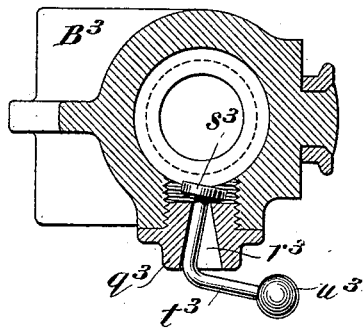
Figure 9:
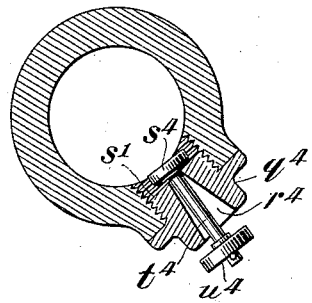

In the accompanying drawings, Figure 1 is a fragmentary longitudinal section of a railway-car, illustrating the main and branch steam-heating pipes thereof to which my improved trap is applied. Fig. 2 is a horizontal section of one of the coupling-heads for uniting the successive sections of pipe, showing my trap applied thereto. Fig. 3 is a transverse section of the coupling-head and trap on the line 3 3 in Fig. 2. Fig. 4 is a side elevation, on a larger scale, of the trap removed. Fig. 5 is a vertical section thereof. Fig. 6 is a vertical section of one of the sediment-wells, showing a slightly-modified construction of my improved trap applied thereto. Fig. 7 is a vertical mid-section of the trap shown in Fig. 6 detached and on a larger scale. Fig. 8 is a cross-section of the coupling answering to Fig. 3, but showing a modified construction. Fig. 9 is a cross-section of a pipe or vessel having a trap of modified construction.

Referring to Fig. 1, let A designate the main steam-heating pipe of a railway-car, and A' a branch pipe leading therefrom into the car, controlled by a valve $b$ and extending to a radiator or storage-heater C, from the outlet of which a pipe $A^2$ leads, as usual, and terminates in a thermostatic drainage-trap G, which automatically discharges the water of condensation as it accumulates and cools. The opposite ends of the main pipe A are connected each by a flexible hose $a$ to a coupling B for uniting the section of pipe to that on the adjoining car, this being the usual arrangement. Numerous constructions of couplings B are known in the art, the one shown being of the so-called "direct port" or "straight port" type, each coupling-head having a seat $c$ at its end adapted to make a tight joint with the like seat of the reciprocal coupling-head and having on one side a locking projection $f$ and on the other side a locking-arm $d$, which extends forwardly and terminates in a locking projection $e$, adapted to engage the projection $f$ upon the reciprocal coupling-head. In the side of the coupling-head is formed an opening $p$, into which is screwed the threaded body of my improved drainage-trap E, as will be presently described.

The main steam-pipe A is provided with one or more condensation water separators or pockets or sediment-wells, of which one is shown in Fig. 1, lettered D. The branch pipe $A^2$ is also provided with a similar sediment-well lettered D', interposed in the lowest portion of the pipe between the descending part thereof and the thermostatic trap G. These sediment-wells D and D' are also provided with my improved drainage-traps, as shown at E' E' in Fig. 1 and as shown more in detail in Fig. 6.

My improved drainage-trap E is constructed with a suitable body portion, shell, or casing $q$, which is preferably screw-threaded, and has a hexagonal projecting head $q'$ by which to screw it in or out, so that it thus constitutes a screw-plug which may be screwed into the side of the coupling-head, as shown in Figs. 2 and 3, or into the side of the sediment-well, as shown in Fig. 6, or into any other part or vessel to which it is desired to apply it. This body or casing is formed with an opening $r$ through it and is provided with a self-seating tilting gravity-valve $s$ at the inner side of the casing. This valve consists of a disk, preferably with a soft-seating composition on its inner face and adapted to seat against a seat $s'$, formed on the inner end of the casing. The valve is fixed on a stem $t$, which passes through the hole $r$ and has mounted on its outer end an impact-disk or baffle-plate $u$, which, preferably, is arranged within a protecting chamber or socket $u'$, formed in the hexagonal head $q'$. The stem $t$ nearly fills the inner end of the opening $r$, which is made conical and smaller at its inner end, thereby keeping the valve $s$ in proper central position and in correct coincidence with the seat $s'$. The disk $u$ and the outer end of the stem $t$ serve as a counter-weight to throw open the valve $s$ by tilting it to the position shown in Fig. 5. In this position the water of condensation drains out of the coupling-head or other part to which the trap is applied. When steam is turned on, the steam-pressure closes the valve to the position shown in Fig. 3. If the escaping steam, acting against the valve $s$, is not sufficient to thus close it, the jet of steam impinging against the baffle-disk $u$ will throw the latter outward, and thereby start the closing movement of the valve and insure its closing. This construction of valve is very simple, having only one moving part, requires no spring or other complication, and has no parts liable to get out of order. As compared with spring-dynamic trap-valves as heretofore made, this trap is found to close with a lower pressure of steam and open against a greater head of accumulated water of condensation than any valve heretofore made, a fact which I attribute to the construction of the valve to open and close by a tilting movement. The trap is best constructed to be mounted in a horizontal position—that is to say, to be introduced into a lateral opening in the coupling-head, as shown in Figs. 1 to 7.

In order to prevent the clogging of the trap-valve by impurities, I introduce a strainer $v$ within the coupling-head, through which the steam or condensed water must pass before reaching the valve. This strainer consists of a cap of perforated sheet metal fastened to the inner end of the plug or body $q$, and in the case of a coupling as shown in Fig. 2 projecting preferably sufficiently far thereinto to partially intercept the current of steam flowing through the coupling, so that the steam shall act by blowing through the openings in the strainer to keep them clear.

In the modified construction shown in Figs. 6 and 7 the inner seat $s'$ (here lettered $s^2$) is made vertical instead of on an incline, as shown in Fig. 5, so that when the valve is seated its stem projects horizontally, as shown in Fig. 6, instead of being thrown diagonally upward, as shown in Fig. 3. This construction is simpler to make, but does not afford quite so large an opening as does the inclined seat.

It is not strictly necessary that the trap-valve be formed with a lateral opening from the coupling-head or other part to which it is applied and made to close against a substantially vertical seat, although this construction is preferable. That which is believed to be characteristic of my invention is that the stem, projecting fixedly from the valve, shall extend in such direction that its weight (or that of a disk or other counter-weight hung on it) shall have its center of gravity sufficiently to one side of the contact of the valve with its seat to overcome the weight of the valve and impart to it a tendency to open by tilting on its seat. Thus the edge on which it tilts constitutes a rocking fulcrum for it. By this means the construction is rendered very simple, and the use of a spring is avoided.

Fig. 8 shows a modification applicable for attachment to the under side of the coupling-head $B^3$ or other part. In this construction the hole or opening $r^3$ through the body of the trap extends downwardly, and the valve-stem $t^3$ extends downwardly through the opening and is then bent laterally and carries at its end a counter-weight $u^3$, the weight of which when the pressure is removed causes the valve $s^3$ to tilt upon its seat to the position shown. Upon turning on pressure the steam escaping through the valve tends to press the valve to its seat and throws the counter-weight outwardly and upwardly.

Fig. 9 shows a construction wherein the valve plug or casing $q^4$ is applied obliquely, so that the valve $s^4$ seats on an inclined plane about midway between a horizontal and vertical. The stem $t^4$ projects perpendicularly to the valve, passing diagonally downward through the opening $r^4$, and carries on its outer end a counterweighting-disk or baffle-plate $u^4$. The operation is the same as in the other constructions, the stem projecting far enough to bring its center of gravity sufficiently to one side of the valve to impart to it a tendency to tilt on its seat, as shown.

I claim as my invention the following-defined novel features, substantially as hereinbefore specified, namely:

1. A steam-drainage trap consisting of a body or casing having an opening through it and formed with a seat, combined with a valve arranged to close outwardly against said seat under an internal steam-pressure, and a counterweighting-stem attached to said valve and projecting laterally therefrom, with its center of gravity arranged sufficiently to one side to impart to the valve a tendency to open by tilting on its seat, whereby upon being relieved of pressure it automatically tilts open and drains out the water of condensation.

2. A steam-drainage trap consisting of a plug or body having an opening through it, a seat at its inner end, a valve arranged to close outwardly against said seat, and a counterweighted stem projecting fixedly from said valve, passing through the opening, and of sufficient weight and projecting sufficiently to one side of the valve to impart to the valve a tendency to open by tilting on its seat.

3. A steam-drainage trap consisting of a body or casing having an opening through it, a seat at its inner end, a valve arranged to close outwardly against said seat and having a stem passing through said opening, and a baffle-disk mounted on said stem outside of said opening in the path of an issuing current of steam, whereby the weight of said disk and stem imparts to the valve a tendency to open, while the impact of steam against the disk contributes a tendency to close the valve.

4. A steam-drainage trap consisting of a body or casing having an opening through it made tapering and smaller at the inner end, a seat at the inner end of said opening, and a valve arranged to close outwardly against said seat and having a stem passing through said opening and nearly filling the smaller end thereof, whereby it guides the valve relatively to the seat, and said stem made of sufficient weight and projecting laterally sufficiently to one side of the valve to throw the valve open on the relief of internal pressure against it.

5. A steam-drainage trap consisting of a plug or body having an opening through it in lateral direction and formed at its inner end with an inclined seat, combined with a valve arranged to close outwardly against said seat and having a counterweighted stem passing through said opening, with its center of gravity sufficiently to one side of the valve to impart to the valve a tendency to open by tilting on its seat.

6. A steam-drainage trap consisting of a plug or body having an opening through it in lateral direction and formed at its inner end with an inclined seat at an inward inclination from the vertical, combined with a valve arranged to close outwardly against said seat and having a counterweighted stem passing through said opening with its center of gravity sufficiently to one side of the valve to impart to the valve a tendency to open by tilting on its seat, whereby the valve, when closed by internal pressure, tilts past the vertical and its stem is thrown upwardly to an inclination above the horizontal, thus insuring a maximum opening when opened.

7. A steam-drainage trap consisting of a plug or body having a conical opening through it in lateral direction, smaller at the inner end, an enlarged head at the outer end of said plug, with a recess within it, a seat formed on the inner end of the plug, a valve arranged to close outwardly against said seat and formed with a stem passing through said opening, and a baffle-disk mounted on the outer end of said stem and arranged within said recess so that it is protected thereby.

8. A steam-drainage trap consisting of a plug or body having a horizontal opening through it, a seat at its inner end, a valve arranged to close outwardly against said seat, a counterweighted stem projecting laterally through said opening and arranged to impart to said valve a tendency to open, and a cup-shaped strainer fastened to the inner end of said body and inclosing the valve.

In witness whereof I have hereunto signed my name in the presence of two subscribing witnesses.

EDWARD E. GOLD.

Witnesses:
ARTHUR C. FRASER,
FRED WHITE.